March 28, 1961   J. E. JONES   2,977,229
SUPERSENSITIZED EMULSIONS COMPRISING SIMPLE CYANINE DYES Filed March 23, 1959

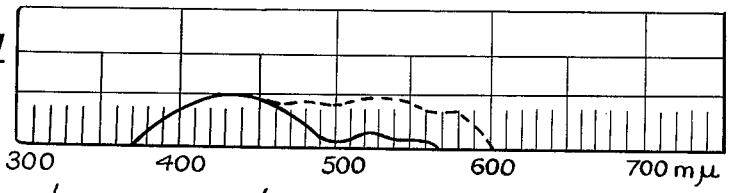

Fig.1

A = 1,1'-DIETHYL-2,4'-CYANINE IODIDE
B = A PLUS 3-ETHYL-5-(1-ETHYL-4(1H)-PYRIDYLIDENE) RHODANINE

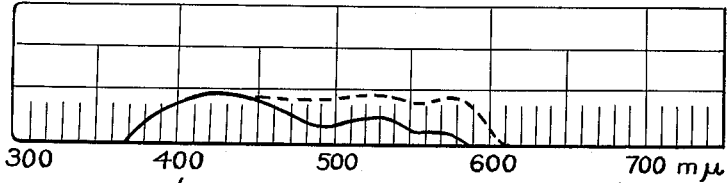

Fig.2

C = ANHYDRO-1'-ETHYL-1-(4-SULFOBUTYL)-2,4'-CYANINE HYDROXIDE
D = C PLUS 3-ETHYL-5-(1-ETHYL-4(1H)-PYRIDYLIDENE) RHODANINE

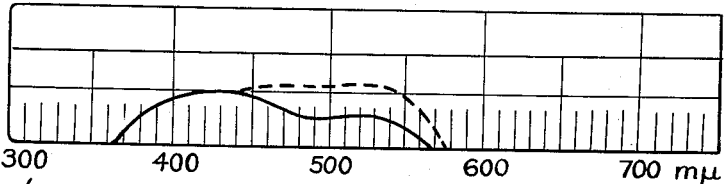

Fig.3

E = 1',3-DIETHYLSELENA-4'-CYANINE IODIDE
F = E PLUS 3-ETHYL-5-(1-ETHYL-4(1H)-PYRIDYLIDENE) RHODANINE

Jean E. Jones
INVENTOR.

BY *R. Frank Smith*
*Lawrence H. Willis*
ATTORNEYS

United States Patent Office 2,977,229
Patented Mar. 28, 1961

2,977,229

SUPERSENSITIZED EMULSIONS COMPRISING SIMPLE CYANINE DYES

Jean E. Jones, Rochester, N.Y., assignor to Eastman Kodak Company, Rochester, N.Y., a corporation of New Jersey Filed Mar. 23, 1959, Ser. No. 801,130

12 Claims. (Cl. 96—104)

This invention relates to photographic silver halide emulsions containing certain simple cyanine dyes and in supersensitizing combination therewith, certain simple merocyanine dyes.

It is known in the art of making photographic emulsions that certain dyes of the cyanine class alter the sensitivity of photographic emulsions of the gelatino-silverhalide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a means of altering the sensitivity in emulsions containing certain simple cyanine dyes. Since the conditions in the emulsion, i.e., the hydrogen ion and/or the silver ion concentration undergo little or no change in my method, I shall designate my new method as a kind of supersensitization.

It is, therefore, an object of my invention to provide photographic silver halide emulsions containing certain simple cyanine dyes and in supersensitizing combination therewith, certain simple merocyanine dyes. Another object is to provide a means for preparing such supersensitized emulsions. Other objects will become apparent from a consideration of the following description and examples.

It has been previously suggested in the prior art that certain carbocyanine dyes can be employed in supersensitizing combinations with various merocyanine dyes of the open-chain type. See Collins et al. U.S. Patent 2,411,507, issued November 26, 1946. This patent also suggests employing certain simple merocyanine dyes containing a ketomethylene ring in combination with various carbocyanine dyes, although it has been found that the supersensitizing effects obtained with such combinations are quite small quantitatively or not measurable in some instances.

However, it has now been found that simple merocyanine dyes containing conventional acidic nuclei and a pyridine nucleus can be used to effectively increase the speed of photographic silver halide emulsions sensitized with various simple cyanine dyes, including 4'-cyanine dyes and 2'-cyanine dyes. The advantages of my invention have not been observed with 4,4'-cyanine dyes, i.e., monomethine cyanine dyes containing two 4-quinoline nuclei. It has further been found that the advantages of my invention are particularly outstanding in the case of simple merocyanine dyes wherein the acidic nucleus has five atoms in the heterocyclic ring, but to be somewhat less outstanding in the case of simple merocyanine dyes wherein the acidic nucleus contains six atoms in the ring, such as simple merocyanine dyes containing a 2-thiobarbituric acid nucleus. The latter dyes are quite difficult to dissolve in some instances, and this might account for their poor showing as supersensitizers according to the method of my invention. However, it has been found that merocarbocyanine dyes containing a 6-membered acidic nucleus can be used to effectively increase the speed of an emulsion sensitized by simple cyanine dyes. It was unexpected, therefore, to find that the simple merocyanine dyes, hereinafter described, could be used to effectively increase the sensitivity of photographic silver halide emulsions sensitized with the simple cyanine dyes, hereinafter described.

The simple merocyanine dyes useful in practicing my invention include those dyes represented by the following general formula:

I. 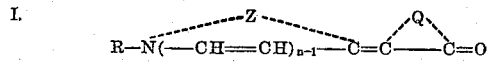

wherein R represents a hydrogen atom or an alcohol radical, i.e., an unsubstituted or substituted alkyl group, such as methyl, ethyl, isopropyl, butyl, isobutyl, β-hydroxyethyl, γ-hydroxypropyl, carboxymethyl, ethoxycarbonylmethyl, benzyl (phenylmethyl), phenacyl (benzoylmethyl), β-phenoxyethyl, β-sulfoethyl, 4-sulfobutyl, etc. (e.g., an alkyl group containing from 1 to 4 carbon atoms), n represents a positive integer of from 1 to 2, Z represents the non-metallic atoms necessary to complete a pyridine nucleus, i.e., a 2-pyridine nucleus (e.g., pyridine, 5-methylpyridine, etc.) or a 4-pyridine nucleus (e.g., pyridine, etc.), and Q represents the non-metallic atoms necessary to complete a heterocyclic nucleus containing five atoms in the heterocyclic ring, such as a pyrazolinone nucleus (e.g., 3-methyl-1-phenyl-5-pyrazolinone, 1-phenyl-5-pyrazolinone, 1-(2-benzothiazolyl)-3-methyl-5-pyrazolinone, etc.), an isoxazolinone nucleus (e.g., 3 - phenyl-5(4H)-isoxazolinone, 3-methyl-5(4H)-isoxazolinone, etc.), an oxindole nucleus (e.g., 1-alkyl-2,3-dihydro-2-oxindoles, etc.), a rhodanine nucleus (i.e., 2-thio-2,4-thiazolidinedione series), such as rhodanine, 3-alkylrhodanines (e.g., 3-ethylrhodanine, 3-ethoxycarbonylmethylrhodanine, 3-allylrhodanine, etc.) or 3-arylrhodanines (e.g., 3-phenylrhodanine, etc.), etc., a 2-selena-2,4-thiazolidinedione nucleus (e.g., 3-ethyl-2-selena-2,4-thiazolidinedione, etc.), a 2-thio-2,4-oxazolidinedione nucleus (i.e., those of the 2-thio-2,4-(3H,5H)-oxazoledione series) (e.g., 3-ethyl-2-thio-2,4-oxazolidinedione, etc.), a 2-thio-2,5-thiazolidinedione nucleus (i.e., the 2-thio-2,5(3H,4H)-thiazoledione series) (e.g., 3-ethyl-2-thio-2,5-thiazolidinedione, etc.), a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.), a thiazolidinone nucleus (e.g., 4 - thiazolidinone, 3-ethyl-4-thiazolidinone, 2-dicyanomethylene-3-ethyl-4-thiazolidonone, 3-phenyl-4-thiazolidinone, 3-α-naphthyl-4-thiazolidinone, etc.), a 4-thiazolinone nucleus (e.g., 2-ethyl-mercapto-4-thiazolinone, 2-alkylphenylamino - 4 - thiazolinones, 2 - diphenylamino - 4 - thiazolinone, etc.), a 2(3H)-thiophenone nucleus (e.g., 5-methyl-2(3H)-thiophenone, etc.), a 2-imino-2,4-oxazolinone (i.e., pseudohydantoin) nucleus, a 2,4-imidazolinedione (hydantoin) nucleus (e.g. 2,4-imidazolinedione, 3-ethyl - 2,4 - imidazolinedione, 3-phenyl-2,4-imidazolinedione, 3-α-naphthyl-2,4-imidazolinedione, 1,3-diethyl-2,4-imidazolinedione, 1-ethyl-3-α-naphthyl-2,4-imidazolinedione, 1,3-diphenyl-2,4-imidazolinedione, etc.), a 2-thio-2,4-imidazolinedione (i.e., 2-thiohydantoin) nucleus (e.g., 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1-ethyl-3-phenyl-2-thio-2,4-imidazolinedione, 1-ethyl-3-α-naphthyl-2-thio-2,4-imidazolinedione, 1,3-diphenyl-2-thio-2,4-imidazolinedione, etc.), a 5-imidazolinone nucleus (e.g., 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

Simple merocyanine dyes including those represented by Formula I above have been previously described in the prior art. For instance, such dyes can be prepared according to the method described in Brooker U.S. Patent 2,185,182, issued January 2, 1940. Brooker U.S. Patent 2,743,274, issued April 24, 1956, also describes the preparation of several simple merocyanine dyes which can be used in my invention. The preparation of other simple merocyanine dyes which can be employed in my invention is described in several examples below.

The simple cyanine dyes which can be employed in my invention include those dyes represented by the following general formula:

II.
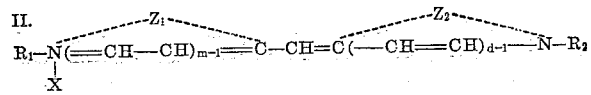

wherein $R_1$ and $R_2$ each represent an alcohol radical, i.e., an unsubstituted or substituted alkyl group, such as methyl, ethyl, isopropyl, butyl, isobutyl, β-hydroxyethyl, β-sulfoethyl, 4-sulfobutyl, etc., or alternatively, an alkylene group, such as ethylene, trimethylene, etc., where one valence bond is attached to the nitrogen atom as shown and the other valence bond is attached to the peri-position of a benzene ring forming a part of the $Z_1$ and $Z_2$ nuclei, X represents an acid radical, such as chloride, bromide, iodide, benzenesulfonate, p-toluenesulfonate, methylsulfate, ethylsulfate, perchlorate, thiocyanate, etc., $m$ and $d$ represents a positive integer from 1 to 2 (provided both $m$ and $d$ do not simultaneously represent 2), $Z_1$ represents the non-metallic atoms necessary to complete a heterocyclic nucleus containing from 5 to 6 atoms in the heterocyclic ring, such as those selected from the group consisting of a thiazole nucleus (a.g., thiazole, 4-methyl, 4-phenylthiazole, 5-methylthiazole, 5-phenylthiazole, 4,5-dimethylthiazole, 4,5-diphenylthiazole, 4-(2-thienyl)thiazole etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2]thiazole, naphtho[2,1]thiazole, 5-methoxynaphtho[2,1]thiazole, 5-ethoxynaphtho[2,1]thiazole, 8-methoxynaphtho[1,2]thiazole, 7-methoxynaphtho[1,2]thiazole, etc.), a thianaphtheno-7′,6′,4,5-thiazole nucleous (e.g., 4′-methoxythianaphtheno-7′,6′,4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho[1,2]oxazole, naphtho[2,1]oxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., naphtho[1,2]selenazole, naphtho[2,1]selenazole, etc.), a thiazoline nucleus (e.g., thiazoline, 4-methylthiazoline, etc.), a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 1-isoquinoline nucleus (e.g., isoquinoline, 3,4-dihydroisoquinoline, etc.), a benzimidazole nucleus (e.g., 1,3-diethylbenzimidazole, 1-ethyl-3-phenylbenzimidazole, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., pyridine, 5-methylpyridine, etc.), a 4-pyridine nucleus (e.g., pyridine, etc.), etc., and $Z_2$ represents the non-metallic atoms necessary to complete a heterocyclic nucleus containing six atoms in the heterocyclic ring, such as a 2-quinoline nucleus (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), a 4-quinoline nucleus (e.g., quinoline, 6-methoxyquinoline, 7-methylquinoline, 8-methylquinoline, etc.), a 2-pyridine nucleus (e.g., pyridine, 5-methylpyridine, etc.), or a 4-pyridine nucleus (e.g., pyridine, etc.).

It will be noted that Formula II above excludes 4,4′-cyanine dyes. In some instances, when the dyes of Formula II have an acid-substituted alkyl group attached to the nitrogen atom, these dyes may spontaneously lose the elements of HX so that the dyes can then be regarded as anhydronium bases. This fact is well known to those skilled in the art. It is, therefore, apparent that the dyes of Formula II might more accurately be regarded as existing in either one of the following ionized forms:

IIa.
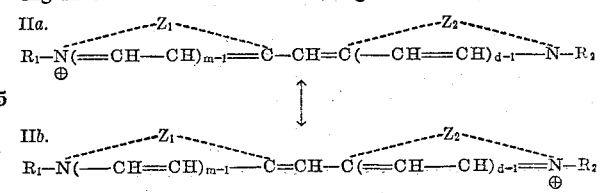

IIb.
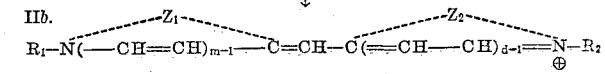

since these simple cyanine dyes are actually adsorbed to the silver halide grains in such forms.

The simple cyanine dyes embraced by Formulas II, IIa and IIb above, include many well known dyes. Such dyes can advantageously be prepared according to the methods described in a number of issued patents, such as Brooker U.S. Patent 1,861,836, issued June 7, 1932; Brooker U.S. Patent 2,202,827, issued June 4, 1940; Brooker U.S. Patent 2,241,237, issued May 6, 1941, etc. The preparation of related simple cyanine dyes is illustrated in several of the examples below.

According to my invention, I incorporate one or more of the simple merocyanine dyes represented by Formula I above with one or more of the simple cyanine dyes represented by Formulas II, IIa and IIb above. My invention is particularly directed to the ordinarily employed gelatino-silver-halide developing-out emulsions. However, my supersensitizing combinations can be employed in silver halide emulsions in which the carrier or vehicle is other than gelatin, e.g., a resinous material, such as polyvinyl alcohol, albumen, etc., or a hydrophilic cellulosic material, which has no deleterious effect upon the light-sensitive halide. The simple merocyanine and simple cyanine dyes useful in my invention can be employed in various concentrations, depending upon the particular emulsion, concentration of silver halide, particular results desired, etc. The simple merocyanine dyes useful in my invention generally have very little or no detectable sensitizing action on their own (i.e., when employed in the absence of other sensitizing materials).

Ordinarily, the optimum, or near optimum, concentration of the simple merocyanine dyes which I employ in practicing my invention is of the order of 0.01 to 0.30 g. per mol. of silver halide in the emulsion.

The simple cyanine dyes useful in practicing my invention can advantageously be used at somewhat higher concentrations than the simple merocyanine dyes, for example, at concentrations varying from about 0.05 to 1.0 g. per mol. of silver halide in the emulsion.

In general, the ratio of concentration of simple merocyanine dye to simple cyanine dye can vary rather widely in my combinations, e.g., from 1:1 to 1:100 (by weight) in many cases.

The methods of incorporating sensitizing dyes in silver halide emulsions are well known to those skilled in the art and these known techniques are employed in dispersing the simple merocyanine and simple cyanine dyes of my invention in the emulsions. These sensitizing dyes can be directly dispersed in the emulsions, or they can first be dissolved in some convenient solvent, such as pyridine, methyl alcohol, acetone, etc. (or mixtures of such solvents), or diluted with water in some instances, and added to the emulsions in the form of these solutions. If desired, the simple merocyanine and simple cyanine dyes can be separately dissolved in a given solvent and added separately to the emulsion, or they can be dissolved in the same or different solvent and these solutions mixed together before addition is made to the silver halide emulsions. The simple merocyanine and simple cyanine dyes can be dispersed in the finished emulsions and should be uniformly distributed throughout the emulsions before the emulsions are coated on a suitable support, such as paper, glass, cellulose ester film, polyvinyl resin film (e.g., polystyrene film, polyvinyl chloride film, etc.), polyester film, etc. The following procedure has been found quite satisfactory: Stock solutions of the simple merocyanine dyes and simple cyanine dyes are prepared by separately dissolving these dyes in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the other dye is slowly added to the emulsion while stirring. Stirring is continued until the second dye is thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure and proportions are to be regarded only as illustrative. Clearly, my invention is directed to any silver halide emulsion containing a combination of the aforesaid simple merocyanine dyes and simple cyanine dyes whereby a supersensitizing effect is obtained.

The following examples will serve to illustrate further the manner of practicing my invention.

To different portions of the same batch of photographic gelatino-silver-bromiodide emulsion were added (1) a simple merocyanine dye, (2) a simple cyanine dye and (3) a combination of the simple merocyanine dye and the simple cyanine dye. The emulsions were held for a short time at about 50–52° C., coated on a transparent support, chill set and dried. The coatings were then exposed to daylight quality radiation through a Wratten No. 12 Filter, except in Examples 34 and 35, in which exposure was made through a Wratten No. 58 Filter. The exposures were made on an Eastman Type Ib Sensitometer. A Wratten No. 12 Filter transmits substantially no light of wavelength shorter than about 495 m$\mu$ (except for about 1% between 300 and 340 m$\mu$), while a Wratten No. 58 Filter transmits only light of wavelength lying between 465 and 620 m$\mu$. The filter was selected to correspond to the maximum sensitizing region of the particular simple cyanine dye illustrated. The exposed coatings were then processed for three minutes in a developer having the following composition:

| | Grams |
|---|---|
| N-methyl-p-aminophenol sulfate | 2.0 |
| Hydroquinone | 8.0 |
| Sodium sulfite (desiccated) | 90.0 |
| Sodium carbonate (monohydrate) | 52.5 |
| Potassium bromide | 5.0 |

Water to make one liter.

The speed, gamma and fog for each of the coatings was then measured. The same emulsion batch was used for the coatings of each example, although not all of the examples used the same emulsion batch. The coatings of Examples 1 to 9 were made from the same batch of emulsion; the coatings of Examples 10 to 16 were made from the same batch of emulsion; the coatings of Examples 17 to 31 were made from the same batch of emulsion; the coatings of Examples 32 and 33 were made from the same batch of emulsion, and the coatings of Examples 34 and 35 were made from the same batch of emulsion. The results obtained are given in the following table. The speed figures are given in terms of relative speed. An asterisk (*) means that the speed or gamma were too low to measure accurately. Dyes are given the same identification throughout the table. Thus, the dye used in Example 1(a) retains that identity even when employed in other examples, such as Example 10(t).

| Example | Dyes (g./mol. AgX) | Relative Speed | Gamma | Fog |
|---|---|---|---|---|
| 1 | (a) 3-ethyl-5-(1-ethyl-4(1H)-pyridylidene) rhodanine (.03) | (*) | (*) | .07 |
| | (b) 3-methyl-1'-ethylthia-2'-cyanine iodide (.08) | 100 | 2.9 | .08 |
| | (c) dye (a) (.03) plus dye (b) (.08) | 148 | 2.5 | .07 |
| 2 | (d) 1,1'-diethyl-2,2'-cyanine iodide (.08) | 57 | 3.0 | .08 |
| | (e) dye (a) (.03) plus dye (d) (.08) | 123 | 2.8 | .09 |
| 3 | (f) anhydro-1'-ethyl-1-(4-sulfobutyl)-2,4'-cyanine hydroxide (.08) | 32 | 2.8 | .08 |
| | (g) dye (a) (.03) plus dye (f) (.08) | 138 | 3.5 | .08 |
| 4 | (h) 1,1'-diethyl-2,4'-cyanine iodide (.08) | 23 | 2.5 | .09 |
| | (i) dye (a) (.03) plus dye (h) (.08) | 91 | 3.4 | .10 |
| 5 | (j) 1'-carboxymethyl-1-ethyl-2,4'-cyanine iodide (.08) | 7 | 2.5 | .06 |
| | (k) dye (a) (.03) plus dye (j) (.08) | 102 | 3.3 | .10 |
| 6 | (l) 1-ethyl-1'-isopropyl-2,4'-cyanine perchlorate (.03) | 5 | 1.9 | .04 |
| | (m) dye (a) (.03) plus dye (l) (.08) | 39 | 2.8 | .11 |
| 7 | (n) 1'-ethyl-1,3,3-trimethylindo-4'-cyanine iodide (.08) | 4 | .71 | .04 |
| | (o) dye (a) (.03) plus dye (n) (.08) | 17 | 1.9 | .06 |
| 8 | (p) 1,3-diethyloxa-4'-cyanine iodide (.08) | 4 | 1.3 | .04 |
| | (q) dye (a) (.03) plus dye (p) (.08) | 14 | 3.4 | .05 |
| 9 | (r) 1,3-diethylthia-4'-cyanine iodide (.08) | 21 | 2.7 | .09 |
| | (s) dye (a) (.03) plus dye (r) (.08) | 76 | 2.3 | .09 |
| 10 | (t) dye (a) (.03) | (*) | (*) | .07 |
| | (u) 1,1'-diethyl-5,6-benzo-2,4'-cyanine iodide (.08) | 100 | 2.5 | .09 |
| | (v) dye (a) (.03) plus dye (u) (.08) | 159 | 2.6 | .08 |
| 11 | (w) 1',3-diethyl-4,5-benzothia-2'-cyanine iodide (.08) | 240 | 1.9 | .09 |
| | (x) dye (a) (.03) plus dye (w) (.08) | 398 | 2.8 | .08 |
| 12 | (y) 1',3-diethyl-4,5-benzothia-4'-cyanine iodide (.08) | 71 | 2.6 | .09 |
| | (z) dye (a) (.03) plus dye (y) (.08) | 224 | 3.0 | .08 |
| 13 | (a') 1',3-diethylthia-4'-pyridocyanine iodide (.08) | 229 | 1.2 | .08 |
| | (b') dye (a) (.03) plus dye (a') (.08) | 251 | 3.2 | .08 |
| 14 | (c') 1',3-diethylselena-4'-cyanine iodide (.08) | 49 | 2.7 | .08 |
| | (d') dye (a) (.03) plus dye (c') (.08) | 195 | 3.1 | .08 |
| 15 | (e') 1-ethyl-1',8'-ethylene-2,4'-cyanine iodide (.08) | 73 | 2.0 | .07 |
| | (f') dye (a) (.03) plus dye (e') (.08) | 159 | 3.1 | .08 |
| 16 | (g') 1,8-ethylene-1',8'-ethylene-2,2'-cyanine iodide (.08) | 45 | 1.4 | .08 |
| | (h') dye (a) (.03) plus dye (g') (.08) | 155 | 2.3 | .07 |

| Example | Dyes (g./mol. AgX) | Relative Speed | Gamma | Fog |
|---|---|---|---|---|
| 17 | (i') dye (a) (.03) | (*) | (*) | .04 |
| | (j') dye (h) (.08) | 100 | 1.8 | .04 |
| | (k') dye (a) (.03) plus dye (h) (.08) | 276 | 1.6 | .04 |
| 18 | (l') 3-ethyl-5-(1-ethyl-2(1H)-pyridylidene) rhodanine (.03) | 33 | 1.6 | .04 |
| 19 | (m') dye (l') (.03) plus dye (h) (.08) | 141 | 1.8 | .05 |
| | (n') 3-ethyl-5-(1-β-hydroxyethyl-4(1H)-pyridylidene) rhodanine (.03) | 47 | 2.0 | .04 |
| 20 | (o') dye (n') (.03) plus dye (h) (.08) | 282 | 1.7 | .05 |
| | (p') 3-ethyl-5-(1-γ-hydroxypropyl-4(1H)-pyridylidene) rhodanine (.03) | (*) | (*) | .05 |
| 21 | (q') dye (p') (.03) plus dye (h) (.08) | 457 | 2.5 | .08 |
| | (r') 5-(1-ethoxycarbonylmethyl-4(1H)-pyridylidene)-3-ethyl-rhodanine (.03) | 57 | 2.0 | .04 |
| 22 | (s') dye (r') (.03) plus dye (h) (.08) | 186 | 1.5 | .04 |
| | (t') 3-ethyl-5-(1-β-phenoxyethyl-4(1H)-pyridylidene) rhodanine (.03) | 37 | 1.5 | .04 |
| 23 | (u') dye (t') (.03) plus dye (h) (.08) | 363 | 1.6 | .05 |
| | (v') 5-(1-benzyl-4(1H)-pyridylidene)-3-ethylrhodanine (.03) | 94 | 2.0 | .04 |
| 24 | (w') dye (v') (.03) plus dye (h) (.08) | 309 | 1.6 | .05 |
| | (x') 2-diphenylamino-5-(1-ethyl-4(1H)-pyridylidene)-4-thiazolinone (.03) | (*) | (*) | .05 |
| 25 | (y') dye (x') (.03) plus dye (h) (.08) | 159 | 1.6 | .04 |
| | (z') 3-ethyl-5-(1-ethyl-4(1H)-pyridylidene)-1-phenyl-2-thiohydantoin (.03) | (*) | (*) | .05 |
| 26 | (a'') dye (z') (.03) plus dye (h) (.08) | 204 | 1.7 | .04 |
| | (b'') anhydro-1'-ethyl-1(4-sulfobutyl)-2,4'-cyanine hydroxide (.08) | 138 | 1.7 | .04 |
| 27 | (c'') dye (a) (.03) plus dye (b'') (.08) | 525 | 1.7 | .06 |
| | (d'') 3-ethyl-5-(1-phenacyl-4(1H)-pyridylidene) rhodanine (.03) | 32 | 1.1 | .04 |
| | (e'') dye (d'') (.03) plus dye (b'') (.08) | 295 | 1.6 | .04 |
| 28 | (f'') 3-ethyl-5-(1-ethyl-4(1H)-pyridylidene)-2-selena-2,4-thiazolidinedione (.03) | (*) | (*) | .04 |
| | (g'') dye (f'') (.03) plus dye (b'') (.08) | 269 | 1.8 | .05 |
| 29 | (h'') 2-dicyanomethylene-3-ethyl-5-(1-ethyl-4(1H)-pyridylidene)-4-thiazolidinone (.03) | (*) | (*) | .05 |
| | (i'') dye (h'') (.03) plus dye (b'') (.08) | 186 | 1.8 | .05 |
| 30 | (j'') 3-ethyl-5-(4(1H)-pyridylidene)-rhodanine (.03) | (*) | (*) | .05 |
| | (k'') dye (j'') (.03) plus dye (b'') (.08) | 513 | 2.4 | .06 |
| 31 | (l'') 3-ethyl-5-[1-(4-sulfobutyl)-4(1H)-pyridylidene] rhodanine (.03) | (*) | (*) | .05 |
| | (m'') dye (l'') (.03) plus dye (b'') (.08) | 468 | 1.6 | .04 |
| 32 | (n'') 3-(1-ethyl-4(1H)-pyridylidene)-5-methyl-2(3H)-thiophenone (.03) | (*) | (*) | .05 |
| | (o'') dye (h) (.08) | 100 | 2.8 | .07 |
| | (p'') dye (n'') (.03) plus dye (h) (.08) | 240 | 2.9 | .06 |
| 33 | (q'') dye (b'') (.08) | 107 | 2.7 | .06 |
| | (r'') dye (n'') (.03) plus dye (b'') (.08) | 229 | 2.9 | .06 |
| 34 | (s'') dye (j'') (.03) | (*) | (*) | .07 |
| | (t'') dye (h) (.08) | 100 | 1.5 | .04 |
| | (u'') dye (j'') (.03) plus dye (h) (.08) | 575 | 3.0 | .08 |
| 35 | (v'') dye (l'') (.03) | 123 | 3.2 | .07 |
| | (w'') dye (l'') (.03) plus dye (h) (.08) | 182 | 3.0 | .07 |

The above examples are merely illustrative and it is to be understood that other merocyanine and cyanine dyes can be employed within the scope of my invention. As indicated above, the supersensitizing effects of my invention are not nearly so outstanding when using emulsions sensitized with carbocyanine dyes, such as 1-ethyl-1',8'-trimethylene-4,4'-carbocyanine iodide. On the other hand, simple merocyanine dyes containing a 6-membered acidic nucleus, such as thiobarbituric acid, cannot be employed to produce the useful effects illustrated above. However, it has been found that merocarbocyanine dyes of the latter type, such as 1,3-diethyl-5-[(1-ethyl-4(1H)-pyridylidene)ethylidene]-2-thiobarbituric acid can be used to provide useful supersensitizing effects with my simple cyanine dyes.

My invention is primarily directed to the ordinarily employed gelatino-silver-halide developing-out emulsions, e.g., gelatino-silver-chloride, -chlorobromide, -chloroiodide, -chlorobromiodide, -bromide and -bromiodide developing-out emulsions. Emulsions which form the latent image mostly inside the silver halide grains, such as the emulsions set forth in Knott et al. U.S. Patent 2,456,956, dated December 21, 1948, can also be employed in practicing my invention.

Photographic silver halide emulsions, such as those listed above, containing the supersensitizing combinations of my invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see Baldsiefen U.S. Patent 2,540,085, issued February 6, 1951; Damschroder U.S. Patent 2,597,856, issued May 27, 1952 and Yutzy et al. U.S. Patent 2,597,915, issued May 27, 1952), various palladium compounds, such as palladium chloride (Baldsiefen U.S. Patent 2,540,086, issued February 6, 1951), potassium chloropalladate (Stauffer et al. U.S. Patent 2,598,079, issued May 27, 1952), etc., or mixtures of such sensitizers; antifoggants, such as ammonium chloroplatinate (Trivelli et al. U.S. Patent 2,566,245, issued August 28, 1951), ammonium chloroplatinite (Trivelli et al. U.S. Patent 2,566,263, issued August 28, 1951), benzotriazole, nitrobenzimidazole, 5-nitroindazole, benzidine, mercaptans, etc. (see Mees—"The Theory of the Photographic Process," MacMillan Pub., 1942, page 460), or mixtures thereof; hardeners, such as formaldehyde (Miller U.S. Patent 1,763,533, issued June 10, 1930), chrome alum (1,763,533), glyoxal (Brunken U.S. Patent 1,870,354, issued August 9, 1932), dibromacrolein (Block et al. British Patent 406,750, accepted March 8, 1934), etc.; color couplers, such as those described in Salminen et al. U.S. Patent 2,423,730, issued July 7, 1947, Spence and Carroll U.S. Patent 2,640,776, issued June 2, 1953, etc.; or mixtures of such addenda. Dispersing agents for color couplers, such as those set forth in Jelley et al. U.S. Patent 2,322,027, issued June 15, 1943, and Mannes et al. U.S. Patent 2,304,940, issued December 15, 1942, can also be employed in the above-described emulsions.

The accompanying drawing illustrates the supersensitizing effect obtained with three of my new combinations of dyes in gelatino-silver-bromiodide emulsions. Each figure of the drawing is a diagrammatic reproduction of two spectrograms. In each figure, the sensitivity of the emulsion containing only the simple cyanine dye of Formula II (or Formulas IIa or IIb) is represented by the solid curve. The sensitivity of the same emulsion containing both a simple cyanine dye and a simple merocyanine dye is represented by the curve consisting of dotted lines. No curve showing the effect of the simple merocyanine dyes alone is shown, inasmuch as the effect of these dyes upon the emulsions was too small to measure accurately.

In Figure 1, Curve A represents the sensitivity of an ordinary gelatino-silver-bromiodide emulsion sensitized with 1,1'-diethyl-2,4'-cyanine iodide, and Curve B represents the sensitivity of the same emulsion sensitized with 1,1'-diethyl-2,4'-cyanine iodide and 3-ethyl-5-(1-ethyl-4(1H)-pyridylidene)-rhodanine. The sensitometric measurements for these emulsions are given in Example 4 of the above table.

In Figure 2, Curve C represents the sensitivity of an ordinary gelatino-silver-bromiodide emulsion sensitized with anhydro-1'-ethyl-1-(4-sulfobutyl)-2,4'-cyanine hydroxide and Curve D represents the sensitivity of the same emulsion sensitized with anhydro-1'-ethyl-1-(4-sulfobutyl-2,4'-cyanine hydroxide and 3-ethyl-5-(1-ethyl-4(1H)-pyridylidene)rhodanine. The sensitometric measurements for these emulsions are given in Example 3 of the above table.

In Figure 3, Curve E represents the sensitivity of an ordinary gelatino-silver-bromiodide emulsion sensitized with 1',3-diethylselena-4'-cyanine iodide and Curve F represents the sensitivity of the same emulsion sensitized with 1',3-diethylselena-4'-cyanine iodide and 3-ethyl-5-(1-ethyl-4(1H)-pyridylidene)-rhodanine. The sensitometric measurements for these emulsions are given in Example 14 of the above table.

The following examples will serve to illustrate the preparation of various simple cyanine and simple merocyanine dyes useful in practicing my invention.

*Example A.—Anhydro-1'-ethyl-1-(4-sulfobutyl)-2,4'-cyanine hydroxide*

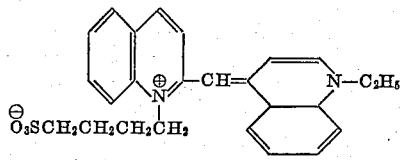

A mixture of 4.4 g. of 1-ethyl-4-phenylmercaptoquinolinium p-toluenesulfonate and 2.65 g. of anhydro-1-(4-sulfobutyl)quinaldinium hydroxide in 25 ml. of anhydrous ethanol and 2.0 g. of triethylamine was heated at the refluxing temperature for 20 minutes. The chilled reaction mixture was filtered and the dye was washed with ethanol. The yield of dye was 71% crude and 38% after two recrystallizations from methanol. The greenish crystals had M.P. 270–273° C. with decomposition.

The anhydro-1-(4-sulfobutyl)quinaldinium hydroxide was prepared by heating a mixture of 14.3 g. of quinaldine and 13.6 g. 1,4-butanesulfone in an oil bath at 140–150° C. for 6 hours. The product was ground under acetone and the suspension was filtered. The yield of somewhat reddish crystals was 14.75 g.

1-ethyl-1'-isopropyl-2,4'-cyanine perchlorate was prepared from 1-ethyl-2-iodoquinolinium iodide and 1-isopropyllepidinium iodide in anhydrous ethanol and triethylamine. The dull dark green crystals from methanol had M.P. 278–280° C. with decomposition.

1'-ethyl-1,3,3-trimethylindo-4'-cyanine iodide was prepared from 1,2,3,3-tetramethyl-3H-pseudoindolium iodide and 1-ethylquinolinium iodide in anhydrous ethanol plus powdered potassium hydroxide. The light brown crystals from methanol had M.P. above 300° C.

1,1'-diethyl-5,6-benzo-2,4'-cyanine iodide was prepared from 1-ethyl-2-methyl-5,6-benzoquinolinium p-toluenesulfonate and 1-ethyl-4-iodoquinolinium iodide in anhydrous ethanol and triethylamine. The green crystals with a coppery reflex had M.P. 256–257° C. with decomposition.

1,8-ethylene-1'-methyl-2,2'-cyanine iodide was prepared from 0.99 g. of 1,8-ethylene-2-methylmercaptoquinolinium p-toluenesulfonate (obtained by heating 0.47 g. of 1,8-ethylene-2-thioquinolone and 0.52 g. of methyl p-toluenesulfonate together at 100° C. for 30 minutes) and 0.72 g. of 1-methylquinaldinium iodide in anhydrous ethanol and 0.28 g. of triethylamine. The red needles with a blue reflex from methanol had M.P. 283–284° C. with decomposition.

*Example B.—3-ethyl-5-(1-β-hydroxyethyl-4(1H)-pyridylidene)-rhodanine*

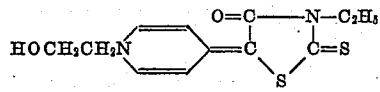

A mixture of 1.87 g. of 4-phenylmercaptopyridine and 1.3 g. of 2-bromoethanol was heated at the temperature of the steam bath for about 18 hours. The resulting 1-(β-hydroxyethyl)-4-phenylmercaptopyridinium bromide and 1.6 g. of 3-ethylrhodanine in 15 ml. of anhydrous ethanol and 2.0 g. of triethylamine were heated at the refluxing temperature for 20 minutes. After cooling the mixture the dye was collected on a filter and washed with ethanol and then water. The yield of dye was 63% crude and 48% after two recrystallizations from pyridine plus methanol added to the hot pyridine filtrate. The reddish crystals had M.P. 249–251° C. with decomposition.

3-ethyl-5-(1-γ-hydroxypropyl-4(1H)-pyridylidene)-rhodanine had M.P. 189–191° C. with decomposition and was prepared in like manner.

In like manner 5-(1-ethoxycarbonylmethyl-4(1H)-pyridylidene)-3-ethylrhodanine was prepared from 3-ethylrhodanine and 1-ethoxycarbonyl-4-phenylmercaptopyridinium bromide (obtained by heating equal molecular proportions of 4-phenylmercaptopyridine and ethyl bromoacetate at the temperature of the steam bath for 2 hours). The dull red crystals had M.P. 237–238° C. with decomposition.

Likewise 3-ethyl-5-(1-β-phenoxyethyl-4(1H)-pyridylidene)-rhodanine was prepared from 3-ethylrhodanine and 1-β-phenoxyethyl-4-phenylmercaptopyridinium bromide (obtained by heating equal molecular proportions of 4-phenylmercaptopyridine and β-bromophenetole at the temperature of the steam bath for about 18 hours). The orange plates had M.P. 232–234° C. with decomposition.

In similar manner 5-(1-benzyl-4(1H)-pyridylidene)-3-ethylrhodanine was prepared from 3-ethylrhodanine and 1-benzyl-4-phenylmercaptopyridinium bromide (obtained by heating equal molecular proportions of 4-phenylmercaptopyridine and α-bromotoluene at the temperature of the steam bath for 2 hours). The dull red crystals had M.P. 246–248° C. with decomposition.

3-ethyl-5-(4(1H)-pyridylidene)rhodanine was prepared by heating a mixture of 3.3 g. of 3-ethylrhodanine and 5.4 g. of 4-phenylmercaptopyridine for 10 minutes at about 270° C. The cool reaction mixture was washed with ether, then acetone and finally more ether. The yield of dye was 46% crude and 23% after purification. The final recrystallization was from pyridine plus methanol added to the hot pyridine filtrate. The orange crystals had M.P. 270–271° C. with decomposition.

3-ethyl-4-[1-(-4-sulfobutyl)-4(1H)-pyridylidene]-rhodanine sodium salt was prepared by heating a mixture of 3.5 g. of 3-ethylrhodanine and 6.46 g. of anhydro-4-phenylmercapto-1-(4-sulfobutyl)pyridinium hydroxide in 15 ml. of dry pyridine and 2.0 g. of triethylamine at the refluxing temperature for 30 minutes. The cool reaction mixture was stirred with ether, the suspension was filtered and the residue was washed with ether. The dye was treated with 10 ml. of water and 4 g. of sodium iodide. After chilling the suspension, the dye was collected on a filter and washed with a little cold water. The yield of dye was 69% after two recrystallizations from acetic acid. The orange crystals had M.P. above 300° C.

The anhydro-4-phenylmercapto-1-(4-sulfobutyl)pyridinium hydroxide was prepared by heating 56.1 g. of 4-phenylmercaptopyridine and 40.8 g. of 1,4-butanesulfone together. The reaction mixture was heated cautiously to 100° C. and then it was placed in an oil bath at 115° C. The temperature of the reaction mixture increased rapidly to 205° C. The mixture was heated in the oil bath for 30 minutes, then cooled, the cake of crystals was broken up and treated with hot acetone. The suspension was filtered, the residue was ground under acetone and the product was collected on a filter and washed with acetone. The yield of nearly colorless crystals was 83.8 g.

3-(1-ethyl-4(1H)-pyridylidene)-5-methyl-2(3H)-thiophenone was prepared by heating a mixture of 2.29 g. of 1-ethyl-4-phenylmercaptopyridinium iodide and 0.76 g. of 5-methyl-2(3H)-thiophenone in 5 ml. of pyridine and 1.0 ml. of triethylamine at the refluxing temperature for 20 minutes. The cool reaction mixture was diluted with ether, the whole was chilled and then the dye was collected on a filter and washed first with ether, then water and finally methanol. The yield of dye was 41% crude and 27% after two recrystallizations from methanol. The bronze needles had M.P. 198–200° C. with decomposition.

The invention has been described in detail with particular reference to preferred embodiments thereof, but it will be understood that variations and modifications can be effected within the spirit and scope of the invention as described hereinabove and as defined in the appended claims.

What I claim as my invention and desire secured by Letters Patent of the United States is:

1. A photographic silver halide developing-out emulsion sensitized with a supersensitizing combination of (1) a simple merocyanine dye selected from the class represented by the following general formula:

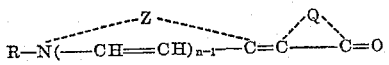

wherein R represents a member selected from the class consisting of a hydrogen atom and an alkyl group, $n$ represents a positive integer of from 1 to 2, Z represents the non-metallic atoms necessary to complete a pyridine nucleus, and Q represents the non-metallic atoms necessary to complete a heterocyclic nucleus selected from the class consisting of a pyrazolinone nucleus, an isoxazolinone nucleus, an oxindole nucleus, a rhodanine nucleus, a 2-selena-2,4-thiazolidinedione nucleus, a 2-thio-2,4-oxazolidinedione nucleus, a 2-thio-2,5-thiazolidinedione nucleus, a 2,4-thiazolidinedione nucleus, a thiazolidinone nucleus, a 4-thiazolinone nucleus, a 2(3H)-thiophenone nucleus, a 2-imino-2,4-oxazolinone nucleus, a 2,4-imidazolinedione nucleus, a 2-thio-2,4-imidazolinedione nucleus, and a 5-imidazolinone nucleus, and (2) a simple cyanine dye selected from the class represented by the following general formula:

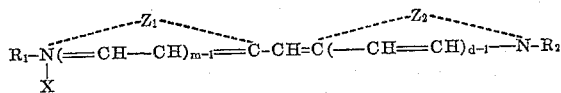

wherein $R_1$ and $R_2$ each represents an alkyl group, X represents an acid radical, $d$ and $m$ each represents a positive integer of from 1 to 2, provided $d$ and $m$ do not simultaneously represent 2, $Z_1$ represents the non-metallic atoms necessary to complete a heterocyclic nucleus selected from the class consisting of a thiazole nucleus, a benzothiazole nucleus, a naphthothiazole nucleus, a thianaphtheno-7′,6′,4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a benzimidazole nucleus, a 3,3-dialkyl-indolenine nucleus, a 2-pyridine nucleus, and a 4-pyridine nucleus, and $Z_2$ represents the non-metallic atoms necessary to complete a heterocyclic nucleus selected from the class consisting of a 2-quinoline nucleus, a 4-quinoline nucleus, a 2-pyridine nucleus and a 4-pyridine nucleus.

2. A photographic silver halide developing-out emulsion as defined in claim 1, wherein the silver halide is silver bromoiodide.

3. A photographic gelatino-silver-halide developing-out emulsion sensitized with a supersensitizing combination of (1) a simple merocyanine dye selected from the class represented by the following general formula:

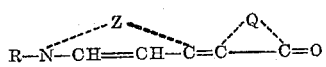

wherein R represents a member selected from the class consisting of a hydrogen atom and an alkyl group, Z represents the non-metallic atoms necessary to complete a 4-pyridine nucleus, and Q represents the non-metallic atoms necessary to complete a rhodanine nucleus, and (2) a simple cyanine dye selected from the class represented by the following general formula:

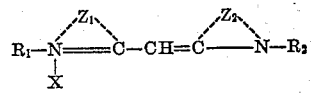

wherein $R_1$ and $R_2$ each represents an alkyl group, X represents an acid radical, $Z_1$ represents the non-metallic atoms necessary to complete a benzothiazole nucleus and $Z_2$ represents the non-metallic atoms necessary to complete a 2-quinoline nucleus.

4. A photographic silver halide developing-out emulsion sensitized with a supersensitizing combination of 3-ethyl-5-(1-ethyl-4(1H)-pyridylidene)rhodanine and 3-methyl-1′-ethylthia-2′-cyanine iodide.

5. A photographic gelatino-silver-halide developing-out emulsion sensitized with a supersensitizing combination of (1) a simple merocyanine dye selected from the class represented by the following general formula:

wherein R represents a member selected from the class consisting of a hydrogen atom and an alkyl group, Z represents the non-metallic atoms necessary to complete a 4-pyridine nucleus and Q represents the non-metallic atoms necessary to complete a rhodanine nucleus, and (2) a simple cyanine dye selected from the class represented by the following general formula:

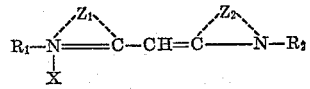

wherein $R_1$ and $R_2$ each represents an alkyl group, X represents an acid radical and $Z_1$ and $Z_2$ each represents the non-metallic atoms necessary to complete a 2-quinoline nucleus.

6. A photographic silver halide developing-out emulsion sensitized with a supersensitizing combination of 3-ethyl-5-(1-ethyl-4(1H)-pyridylidene)rhodanine and 1,1′-diethyl-2,2′-cyanine iodide.

7. A photographic gelatino-silver-halide developing-out emulsion sensitized with a supersensitizing combination of (1) a simple merocyanine dye selected from the class represented by the following general formula:

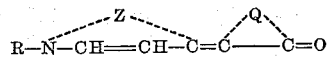

wherein R represents a member selected from the class consisting of a hydrogen atom and an alkyl group, Z represents the non-metallic atoms necessary to complete a 4-pyridine nucleus and Q represents the non-metallic atoms necessary to complete a 4-thiazolinone nucleus, and (2) a simple cyanine dye selected from the class represented by the following general formula:

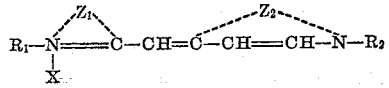

wherein $R_1$ and $R_2$ each represents an alkyl group, X represents an acid radical, $Z_1$ represents the non-metallic atoms necessary to complete a 2-quinoline nucleus and $Z_2$ represents the non-metallic atoms necessary to complete a 4-quinoline nucleus.

8. A photographic silver halide developing-out emulsion sensitized with a supersensitizing combination of 2-diphenylamino-5-(1-ethyl-4(1H)-pyridylidene)-4-thiazolinone and 1,1′-diethyl-2,4′-cyanine iodide.

9. A photographic gelatino-silver-halide developing-out emulsion sensitized with a supersensitizing combination of (1) a simple merocyanine dye selected from the class represented by the following general formula:

wherein R represents a member selected from the class consisting of a hydrogen atom and an alkyl group, Z represents the non-metallic atoms necessary to complete a 4-pyridine nucleus and Q represents the non-metallic atoms necessary to complete a 2-thiohydantoin nucleus, and (2) a simple cyanine dye selected from the class represented by the following general formula:

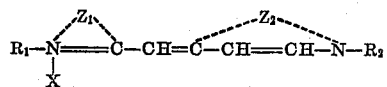

wherein $R_1$ and $R_2$ each represents an alkyl group, X represents an acid radical, $Z_1$ represents the non-metallic atoms necessary to complete a 2-quinoline nucleus and $Z_2$ represents the non-metallic atoms necessary to complete a 4-quinoline nucleus.

10. A photographic silver halide developing-out emulsion sensitized with a supersensitizing combination of 3-ethyl-5-(1-ethyl-4(1H)-pyridylidene)-1-phenyl-2-thiohydantoin and 1,1'-diethyl-2,4'-cyanine iodide.

11. A photographic gelatino-silver-halide developing-out emulsion sensitized with a supersensitizing combination of (1) a simple merocyanine dye selected from the class represented by the following general formula:

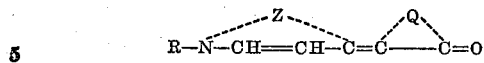

wherein R represents a member selected from the class consisting of a hydrogen atom and an alkyl group, Z represents the non-metallic atoms necessary to complete a 4-pyridine nucleus and Q represents the non-metallic atoms necessary to complete a rhodanine nucleus, and (2) a simple cyanine dye selected from the class represented by the following general formula:

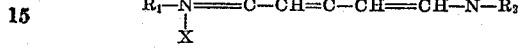

wherein $R_1$ and $R_2$ each represents an alkyl group, X represents an acid radical, $Z_1$ represents the non-metallic atoms necessary to complete a 2-quinoline nucleus and $Z_2$ represents the non-metallic atoms necessary to complete a 4-quinoline nucleus.

12. A photographic silver halide developing-out emulsion sensitized with a supersensitizing combination of 3-ethyl-5-(1-ethyl-4(1H)-pyridylidene)rhodanine and anhydro-1'-ethyl-1-(4-sulfobutyl)-2,4'-cyanine hydroxide.

References Cited in the file of this patent

UNITED STATES PATENTS

| | | |
|---|---|---|
| 2,411,507 | Collins et al. | Nov. 26, 1946 |
| 2,430,558 | Carroll et al. | Nov. 11, 1947 |